United States Patent [19]

Marui

[11] Patent Number: 5,101,500
[45] Date of Patent: Mar. 31, 1992

[54] RADIO TELECOMMUNICATION APPARATUS

[75] Inventor: Kuniyoshi Marui, Saitama, Japan

[73] Assignee: Kabushiki Kaisha Toshiba, Kanagawa, Japan

[21] Appl. No.: 357,603

[22] Filed: May 26, 1989

[30] Foreign Application Priority Data

May 30, 1988 [JP] Japan .................. 63-132071
May 30, 1988 [JP] Japan .................. 63-132072

[51] Int. Cl.$^5$ ........................... H04Q 7/00
[52] U.S. Cl. .......................... 455/33; 455/33; 455/34; 455/56; 379/60; 379/63
[58] Field of Search ........ 455/33, 34, 54, 186; 379/57, 59, 60, 63

[56] References Cited

U.S. PATENT DOCUMENTS

| | | |
|---|---|---|
| 4,233,473 | 11/1980 | Frost . |
| 4,672,657 | 6/1987 | Dershowitz . |
| 4,677,653 | 6/1987 | Weiner et al. .......... 379/58 |
| 4,734,928 | 3/1988 | Weiner et al. .......... 379/59 |
| 4,742,560 | 5/1988 | Arai . |
| 4,761,806 | 8/1988 | Toki . |
| 4,775,999 | 10/1988 | Williams .............. 379/59 |
| 4,831,647 | 5/1989 | D'Avello et al. . |
| 4,833,701 | 5/1989 | Comroe et al. . |
| 4,833,702 | 5/1989 | Shitara et al. .......... 379/60 |
| 4,891,638 | 1/1990 | Davis . |
| 4,905,301 | 2/1990 | Krolopp et al. .......... 455/33 |
| 4,913,728 | 4/1990 | Blair . |
| 5,020,091 | 5/1991 | Krolopp et al. .......... 379/60 |

FOREIGN PATENT DOCUMENTS 0260763 3/1988 European Pat. Off. .
2172775A 9/1986 United Kingdom .

OTHER PUBLICATIONS

European Search Report for application No. EP89305373.

Primary Examiner—Reinhard J. Eisenzopf
Assistant Examiner—Lisa Charouel
Attorney, Agent, or Firm—Banner, Birch, McKie & Beckett

[57] ABSTRACT

Radio telecommunication apparatus which includes storing a plurality of identification numbers of the apparatus. Each identification number of the apparatus is stored with an associated system identification number. Responsive to a system identification number transmitted from a base unit an identification number of the apparatus corresponding to the system identification number is selected. The selected identification number is broadcast over a radio channel. Still the apparatus receives all incoming calls having an identification number which is the same as one of the stored identification numbers.

22 Claims, 8 Drawing Sheets

| ADDRESS | SYSTEM IDENTI-FICATION NUMBER | MOBILE IDENTI-FICATION NUMBER |
|---------|-------------------------------|-------------------------------|
| FF 00   | SID 1                         | MID 1                         |
| FF 10   | SID 2                         | MID 2                         |
| FF 20   | SID 3                         | MID 3                         |

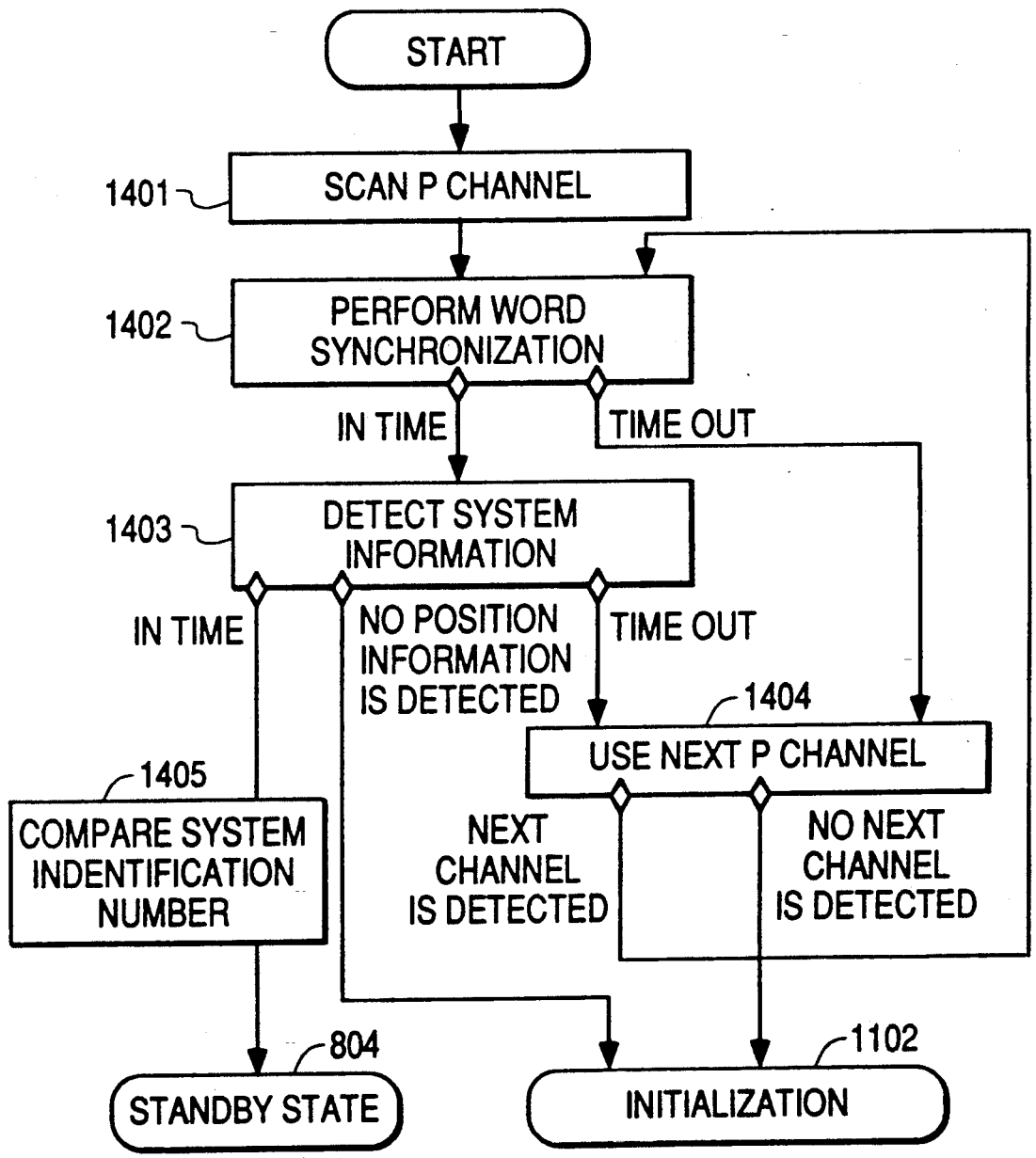

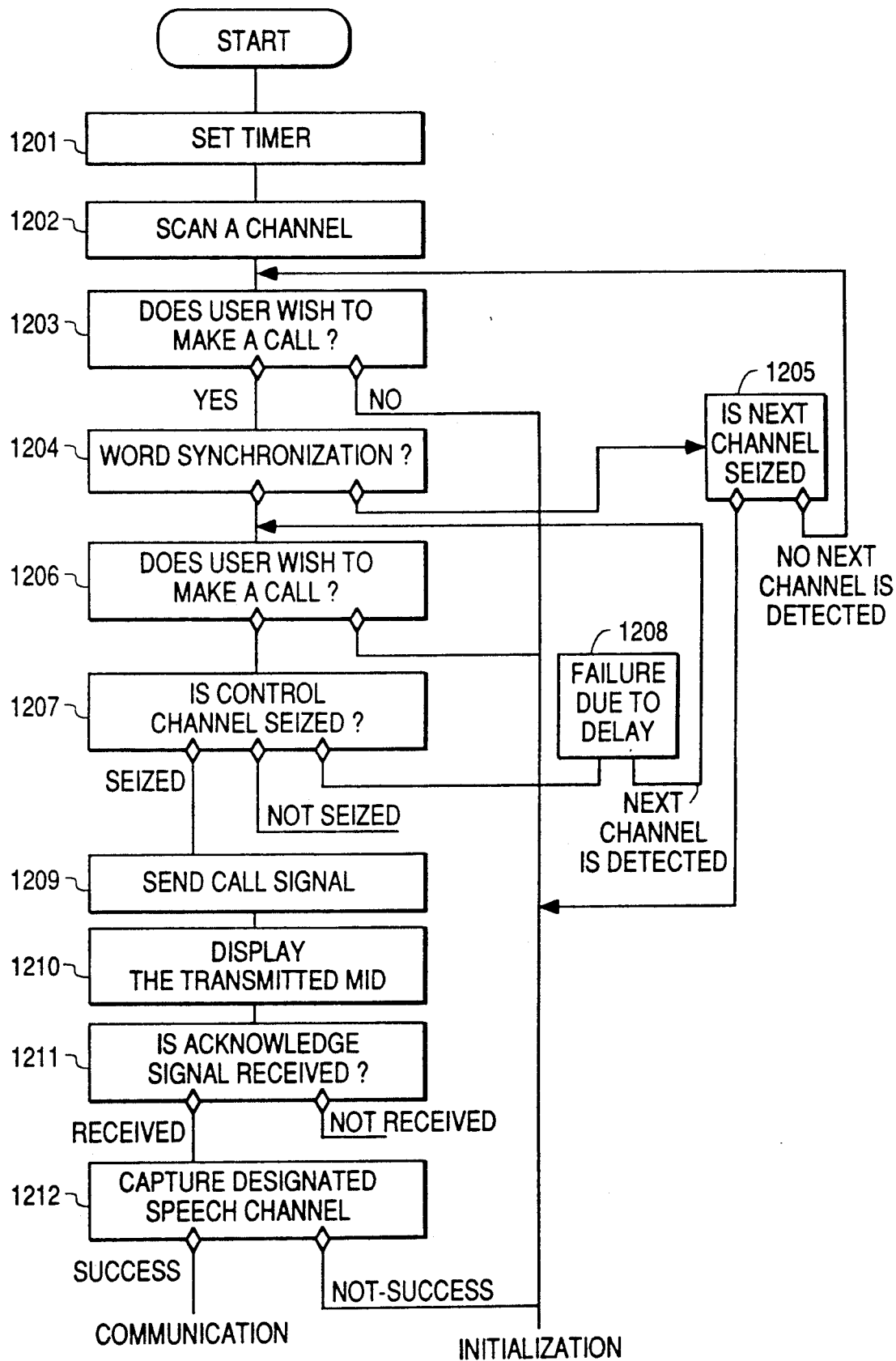

RADIO TELECOMMUNICATION APPARATUS

FIELD OF THE INVENTION

The present invention relates to the field of radio telecommunication apparatus used in a radio telecommunication system and, more specifically, to radio telecommunication apparatus having a plurality of identification numbers, each of which is registered in each of a plurality of areas.

BACKGROUND OF THE INVENTION

In prior art cellular radio telephone systems, a geographical area is covered and served by breaking the area into a plurality of small zones or cells. A large land area can be covered by a plurality of connected cells areas. A mobile telephone switching office (MTSO) is provided for each area and is connected to a plurality of base stations, each covering a cell within the area.

FIG. 1 is a diagram illustrating a conventional cellular radio telephone system. Referring to FIG. 1, the user of cellular radio telephone 101 usually travels within an area 102 and is assigned an identification (ID) number for the user's cellular radio telephone which is registered in a corresponding MTSO 103 which covers the area. The area is called a home area and the user is called a home area user. If the user travels out of area 102 and enters another area, the new area is called a roam area and the user is called a roamer in the new area. User fees for calls from the cellular radio telephone via the MTSO covering the roam area are higher than there via the MTSO covering the home area. It should be noted that, when a call is made from a cellular radio telephone, the ID number for the cellular radio telephone is transmitted to the MTSO covering the area where the cellular radio telephone is located and the MTSO can therefore distinguish roamers and home area users by checking whether the transmitted ID number is registered in the MTSO. Accordingly, some conventional cellular radio telephones have a plurality of ID numbers so that each of the ID numbers, each one of which is registered to a different area.

FIG. 2 is a further diagram illustrating a conventional cellular radio telephone system. Referring to FIG. 2, if the user of cellular radio telephone 201 registers ID #1 to MTSO 203 covering area #1 and ID #2 to MTSO 204 covering area #2, either area #1 or area #2 could become the home area for the user by using the ID number registered in the MTSO covering the area when a call is made.

In a conventional cellular radio telephone as mentioned above, an ID number is manually selected by the user. In the situation shown in FIG. 2, when a user is within area #1 and makes a call, the user has to select ID #1 by operating a changeover switch provided in the cellular radio telephone to reduce speech charges. Otherwise, ID #2 may be sent to MTSO 203 covering area #1 which would result in higher speech charges because MTSO 203 identifies the call as being that from a roamer. Therefore, it is necessary for a user to pay attention to whether the proper ID number for the area is selected when the user makes a call. In some situations, however, a user does not exactly know which area he presently is in. Thus, the user cannot select the proper ID number.

Furthermore, another problem exists in receiving an incoming call. Once an ID number is selected by operating the changeover switch in a cellular radio telephone, the telephone receives only incoming calls having the selected ID number. Accordingly, when an ID number is selected, if a caller knows only another ID number, a call from the caller is never received by the cellular radio telephone even though the system broadcasts a paging signal accompanied with the other ID number and the cellular radio telephone is not busy.

SUMMARY OF THE INVENTION

It is accordingly an object of the present invention to provide novel radio telecommunication apparatus having a plurality of ID numbers in which an ID number is properly selected from a plurality of ID numbers.

It is a further object of the present invention to provide a novel radio telecommunication apparatus having a plurality of ID numbers in which it is not necessary for a user to select an ID number to be transmitted, thereby the operability of the telephone is greatly improved.

It is a still further object of the present invention to provide an improved radio telecommunication apparatus having a plurality of ID numbers in which the proper ID number for the present area is selected so that charges for the usage of radio channels is reduced as much as possible.

It is another object of the present invention to provide an improved radio telecommunication apparatus having a plurality of ID numbers in which an incoming call addressed to any one of the plurality of ID numbers can be received.

According to this invention, an ID number is automatically selected in response to a system identification number (SID) transmitted from a base station. FIG. 3 is a diagram which illustrates the principles of the present invention applied to a cellular radio telecommunication system in which a MTSO is connected to a plurality of base stations, each covering a cell. Referring to FIG. 3, the cellular radio telephone 301 comprises a memory 302 for storing a plurality of ID numbers, such as ID#1 and ID#2, which are associated with a plurality of corresponding system identification numbers, such as :SID#1 and SID#2.

When the cellular radio telephone is located within home area #1, the telephone receives SID#1 transmitted from MTSO 303, in which ID#1 is registered, via a base station at the time of initialization, in a standby mode, or prior to a call origination. Responsive to the reception of SID#1, cellular radio telephone 301 selects the corresponding identification number ID#1 from memory 302 and transmits the selected number to MTSO 303 via a base unit. MTSO 303 receives the ID#1 and compares the ID#1 with identification numbers previously registered in MTSO 303. Since ID#1 is already registered in MTSO 303, MTSO 303 treats cellular radio telephone 301 as a home area user traveling within a home area. Accordingly, speech charges in this case are cheaper than that in the case where cellular radio telephone 301 is treated as a roamer by transmitting ID#2.

If cellular radio telephone 301 travels out of area #1 and enters area #2, telephone 301 receives SID#2 from MTSO 304, in which ID#2 is registered, via a base station at the time of initialization, in a standby state, or prior to a call origination. Responsive to the reception of SID#2, telephone 301 transmits the corresponding identification number ID#2 to MTSO 304 via a base station. Accordingly, telephone 301 entering area #2 is treated as a home area user in a home area by MTSO 304. Thus, speech charges are cheaper than in the case where the user is treated as a roamer. Accordingly, it is not necessary for a user of the cellular radio telephone to operate the changeover switch.

In accordance with another feature of the present invention, when an incoming call, including an identification number, is received by the cellular radio telephone, all of the identification numbers stored in the cellular radio telephone are checked for coincidence with the received identification number. Thus, a caller may call a cellular radio telephone by dialing any one of a plurality of identification numbers registered in the cellular radio telephone.

BRIEF DESCRIPTION OF THE DRAWINGS

FIG. 9 is a flow chart illustrating the operation after initialization in the connection control operation sequence; and FIG. 10 is a flow chart illustrating the call origination operation sequence.

DETAILED DESCRIPTION OF THE PREFERRED EMBODIMENT

A preferred embodiment of the present invention applied in a mobile telephone will be described with reference to the accompanying drawings.

Figure 1:
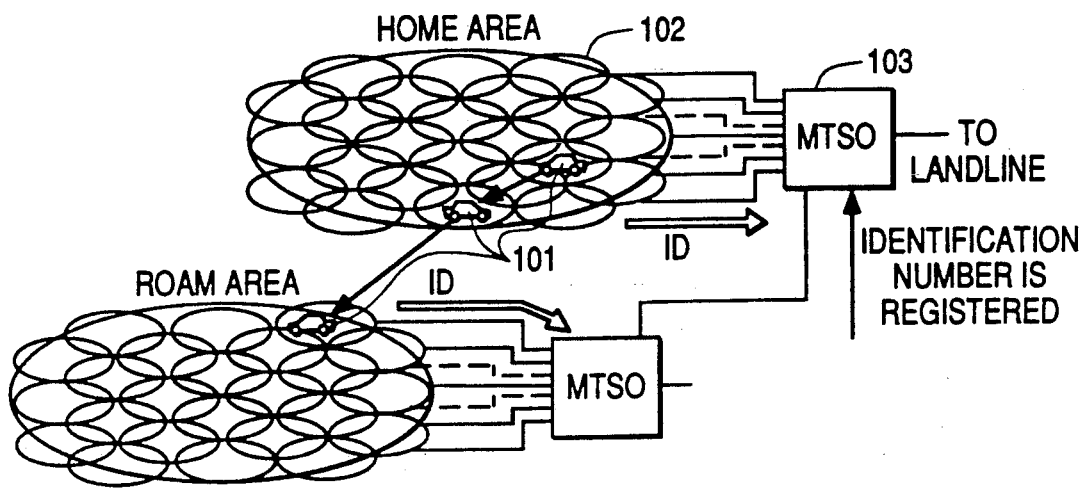
FIG. 1 is a block diagram illustrating a conventional cellular radio telephone system.
Figure 2:
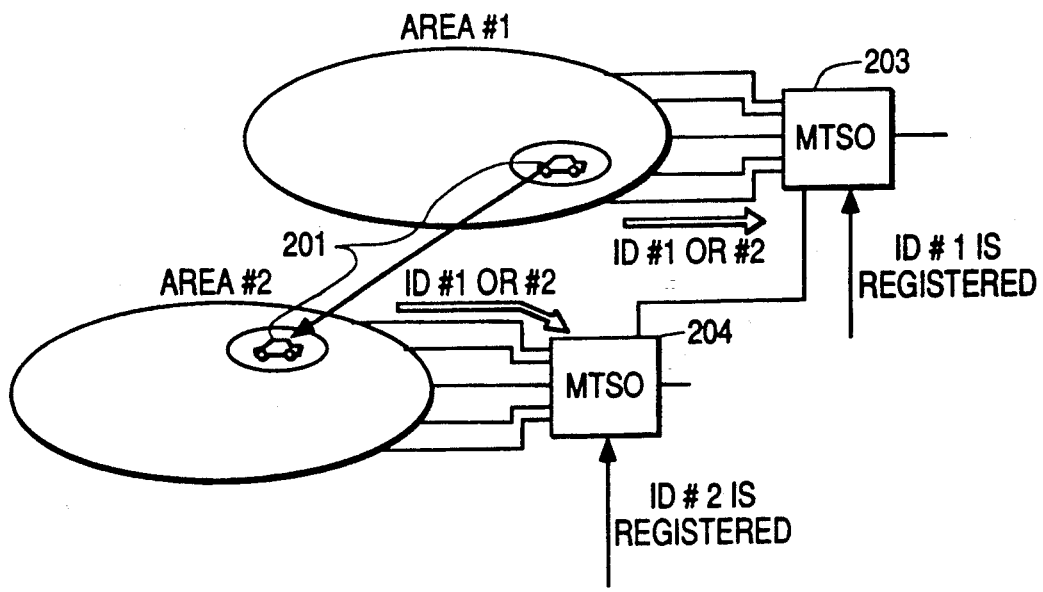
FIG. 2 is a block diagram illustrating a conventional cellular radio telephone apparatus for use in a cellular radio telephone system.
Figure 3:
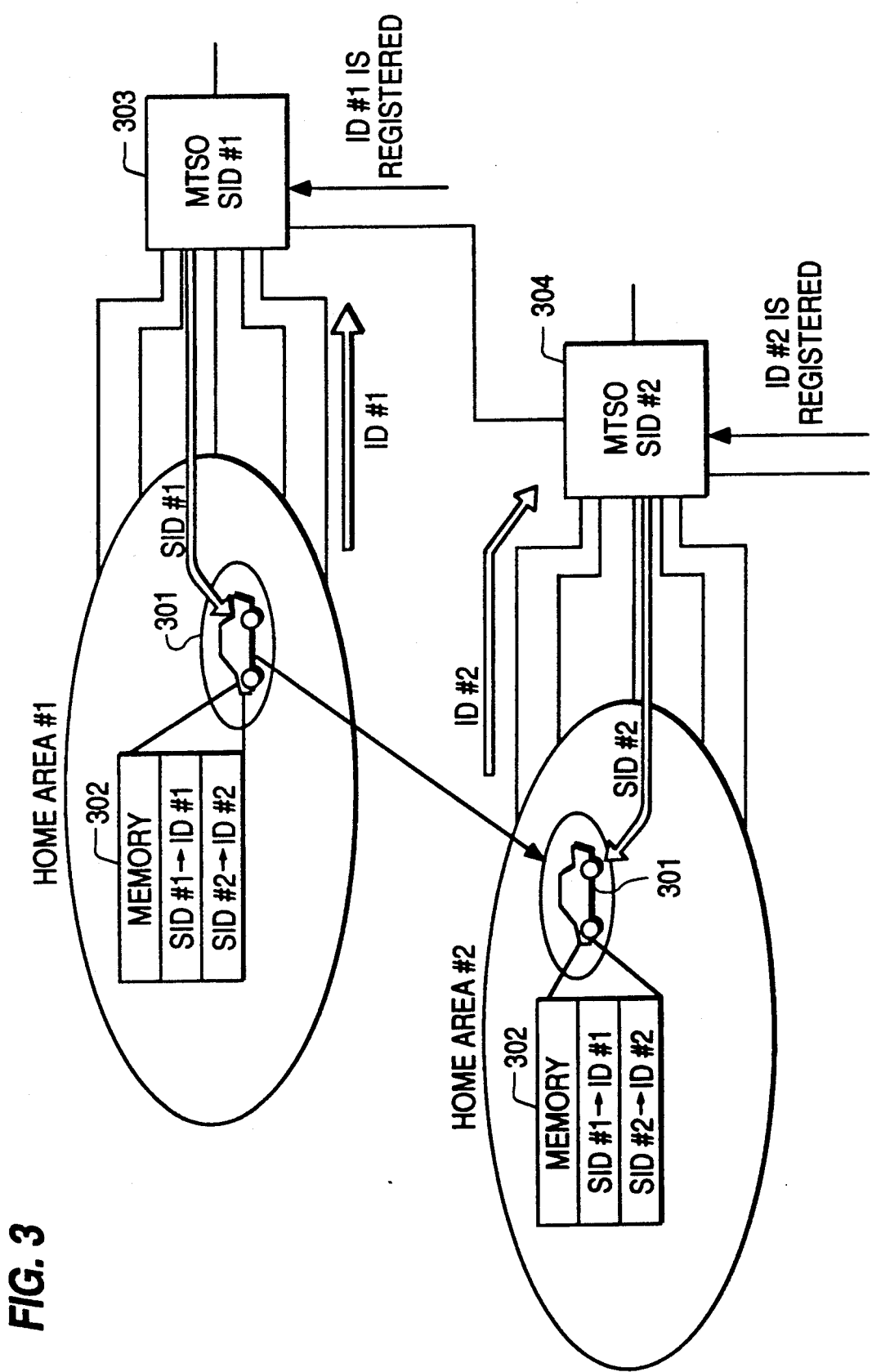
FIG. 3 is a block diagram illustrating the cellular radio telephone system of the present invention.
Figure 4:
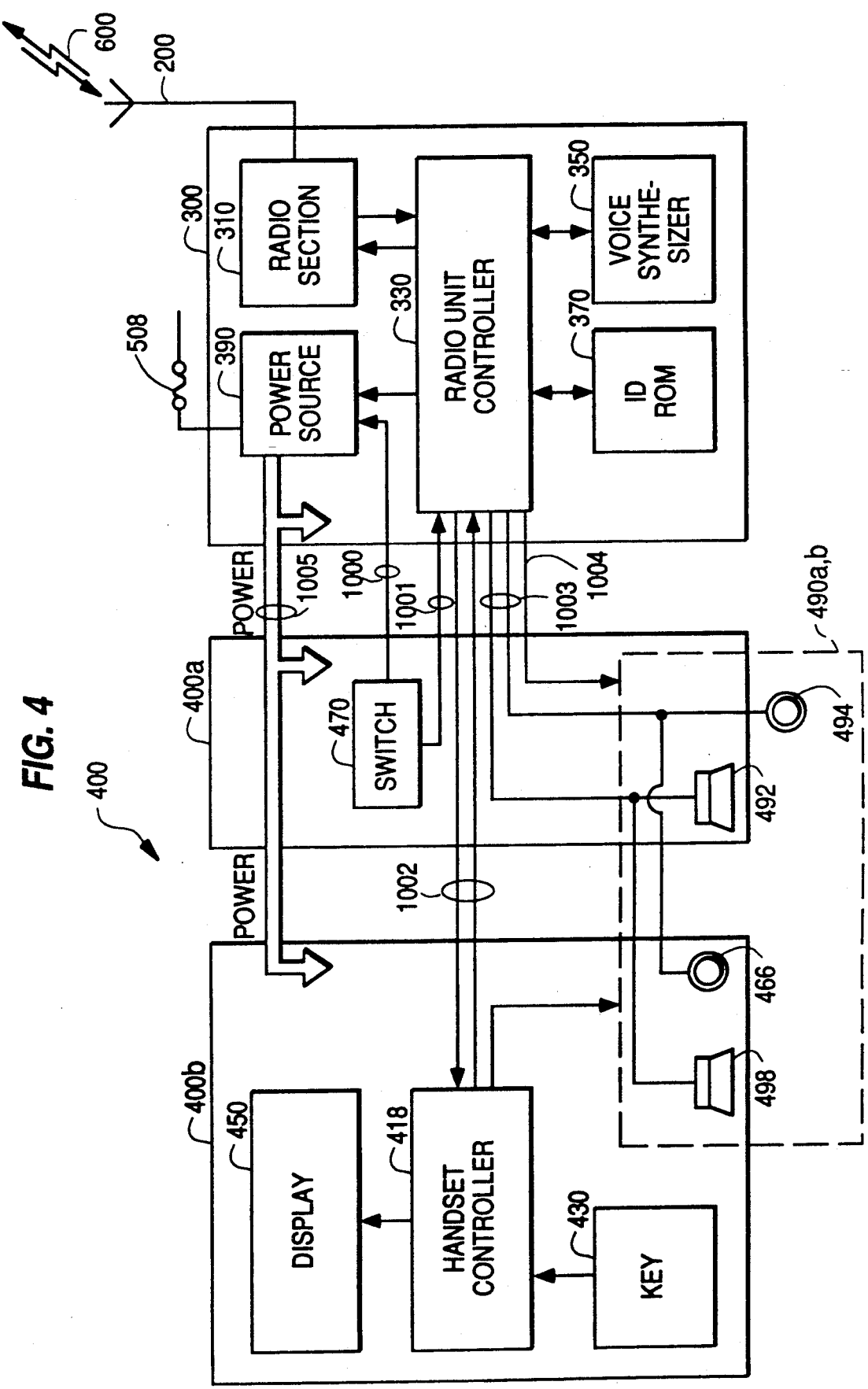
FIG. 4 is a block diagram showing an arrangement of a mobile telephone apparatus according to an embodiment of the present invention.

FIG. 4 is a block diagram showing an arrangement of a mobile telephone apparatus according to an embodiment of the present invention. Referring to FIG. 4, mobile telephone apparatus 100 comprises antenna 200, radio unit 300 and telephone unit 400. Antenna 200 is mounted on an outer body surface of an automobile. Telephone unit 400 is mounted near the driver's seat inside the automobile.

Radio unit 300 includes radio section 310 for establishing radio channels 600 with a base station (not shown) through antenna 200 and for exchanging signals therewith, radio unit controller 330 for controlling the overall operations of the apparatus, voice synthesis circuit 350 for synthesizing voices, ID ROM 370 for storing ID numbers with the corresponding system identification numbers and power source 390 for supplying power from the battery mounted in the automobile to the above components through fuse 508.

Telephone unit 400 includes handset controller 418 for controlling the overall operations of telephone unit 400 in response to instructions or the like from radio unit controller 330, key unit 430 for entering key inputs, display unit 450 for displaying numerical or alphabetical characters in response to control signals from handset controller 418, switches 470 including a hook switch and a power switch, and selectable audio input/output units 490a and 490b for inputting or outputting an audible sound. Telephone unit 400 may be divided into main unit 400a and handset 400b. Microphone 494 may be a hands-free microphone 494 mounted on a sun visor or the like near the driver's seat and is connected to main unit 400a. Loudspeaker 492 may be mounted in main unit 400a. Handset controller 418, key unit 430, and display unit 450 are mounted in handset 400b. Handset microphone 466 and handset receiver 498 constitute audio input/output unit 490b of handset 400b.

Each section of radio unit 300, main unit 400a and handset 400b is supplied power by way of a power line 1005 extending from power source 390 in radio unit 300. The opened or closed status of switches 470 is transmitted to power source 390 or radio unit controller 330 by way of line 1000 or line 1001, respectively. Control and/or command signals are transmitted between handset controller 418 and radio unit controller 330 by way of line 1002. Audio signals are transmitted by way of lines 1003. Radio unit controller 330 sends control signals to audio input/output unit 490a, 490b by way of lines 1004.

Figure 5:
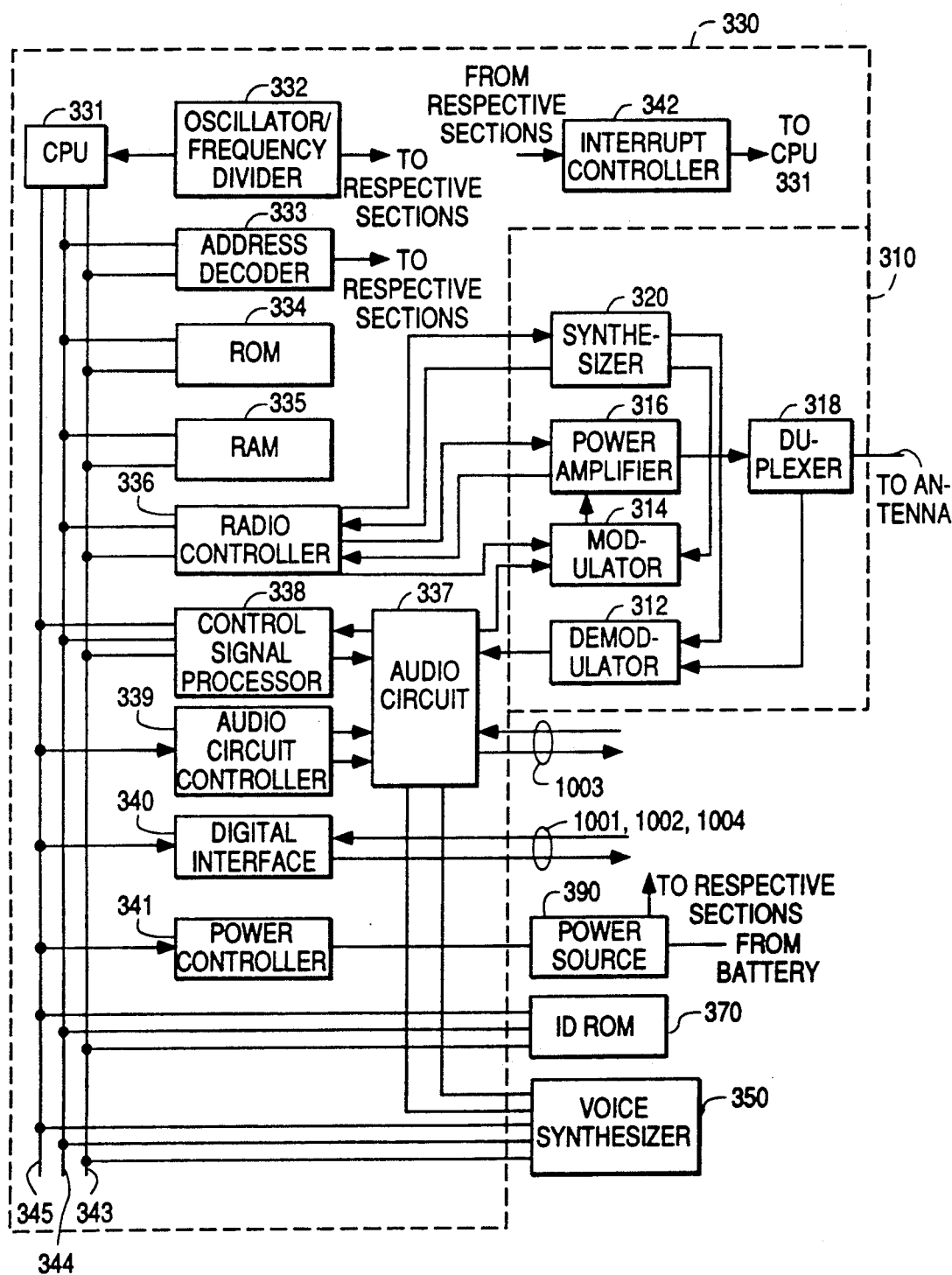
FIG. 5 is a block diagram of radio unit 300 shown in FIG. 4.

FIG. 5 is a block diagram showing a detailed arrangement of the radio unit of FIG. 4. Referring to FIG. 5, radio section 310 comprises demodulator 312, modulator 314 and synthesizer 320. Demodulator 312 demodulates a radio signal received from the base station through radio channels 600, antenna 200 and duplexer 318. It should be noted that this signal includes audible sound signals and control signals. Modulator 314 modulates the audio and control signals received from audio controller 300 and generates the required transmission signals.

Power amplifier 316 amplifies the trasmission signals received from modulator 314. The amplification of power amplifier 316 may be continuous or variable in a step-wise fashion, e.g., 8-step variable. Duplexer 318 sends the signals received through radio channel 600 to demodulator 312 and the signals from modulator 314 and power amplifier 316 to antenna 200. Synthesizer 320 is formed of a channel selection local oscillator and specifies a frequency from which signals are demodulated by demodulator 312 and a frequency to which signals are modulated by modulator 314. About 666 channels are available from synthesizer 320.

Radio unit controller 330 is formed at central processing unit (CPU) 331, oscillator/frequency divider 332, address decoder 333, ROM 334, RAM 335, radio controller 336, audio circuit 337, control signal processor 338, audio circuit controller 339, digital interface 340, power controller 341 and interrupt controller 342. Reference numerals 343, 344 and 345 denote a data bus, an address bus and a control bus, respectively. CPU 331 controls the operation of radio unit controller 330. Oscillator/frequency divider 332 supplies clock signals to CPU 331 and divides the clock signals to supply appropriate frequency-divided pulses as timing pulses to each section of the mobile telephone apparatus requiring them. Address decoder 333 outputs predetermined operation signals to the components in response to instruction signals from CPU 331. ROM 334 stores various programs required for operation of CPU 331. RAM 335 stores various types of data during processing for use by CPU 331. Radio controller 336 controls radio section 310 in response to instructions from CPU 331. For example, radio controller 336 sends signals indicative of available frequencies to synthesizer 320, signals indicative of an amplification level to power amplifier 316, and signals indicative of modulation parameters to modulator 314. Radio controller 336 receives a step-out signal from synthesizer 320 and output power detection signals from power amplifier 316 and forwards these signals to CPU 331, thereby preventing operational errors.

Audio circuit 337 extracts control signals and audio signals from the received signals demodulated by demodulator 312 and supplies the control signals to control signal processor 338 and the audio signals to telephone unit 400. Audio circuit 337 also supplies a control signal from control signal processor 338 and audio signals from telephone set 400 to modulator 314. It should be noted that audio circuit 337 also arranges the waveform of the control signal to be sent to control signal processor 338 in a particular signal format and filters the control signal to be supplied to modulator 314. Control signal processor 338 acquires bit and frame synchronization with the control signal from audio circuit 337. Maintaining the required synchronization, control signal processor 338 converts the serial control signals, including control data received from a base station, into parallel signals and converts the parallel control data signals to be transmitted to a base station into serial signals. The control signals are sent to and from the base station via audio circuit 337.

Audio circuit controller 339 controls audio circuit 337. Under the control of audio circuit controller 339, for example, audio circuit 337 applies the received signals from demodulator 312 to control signal processor 338 or telephone unit 400 and selectively receives the signals from control signal processor 338 or telephone unit 400. Digital interface 340 interfaces the data communication between radio unit 300 and telephone unit 400. Power controller 341 controls power source 390 and sets a voltage supplied from battery 506 to power source 390 to a predetermined level. The voltage having the predetermined level is supplied to the respective circuit components.

Figures 6, 8:
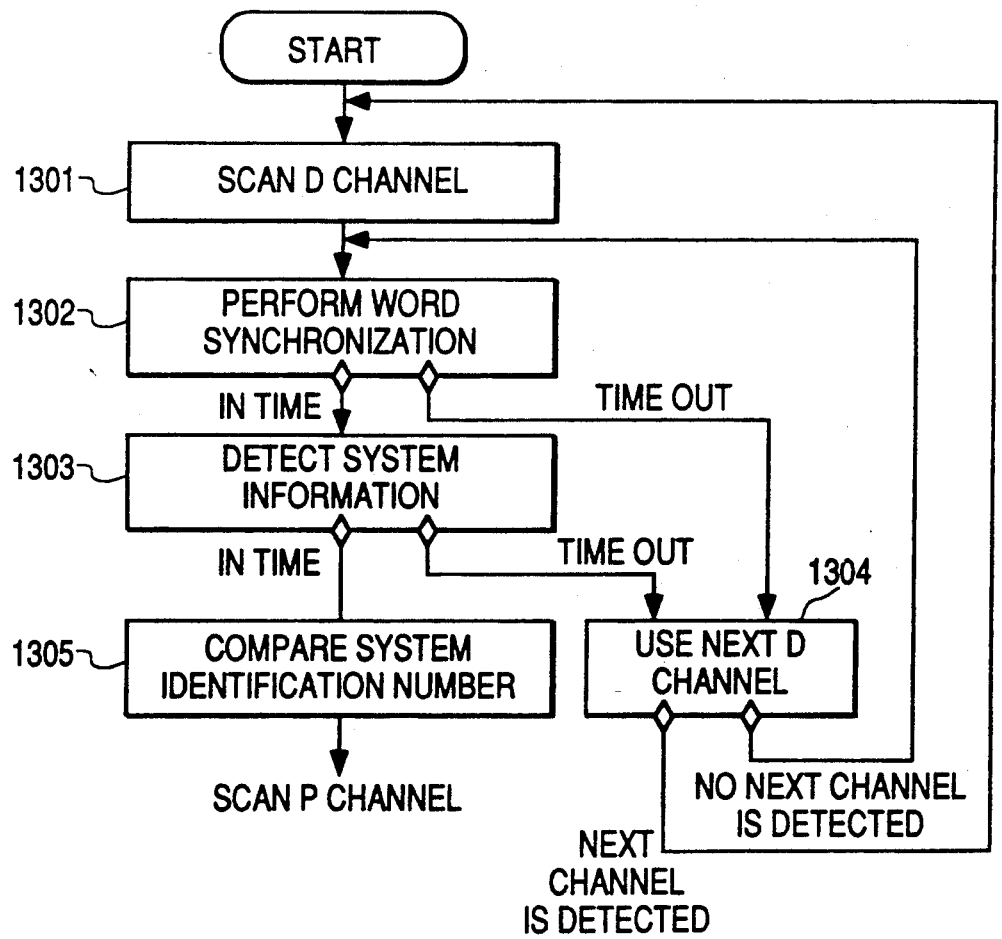
FIG. 6 is a chart illustrating the contents of ID ROM 370 shown in FIGS. 4 and 5.
FIG. 8 is a flow chart for illustrating initialization step 802 in the connection control operation of FIG. 7.

FIG. 6 is a diagram which illustrates the contents of ID ROM 370 shown in FIGS. 4 and 5. In this embodiment, three mobile identification numbers MID1-3, which are identification numbers for the mobile telephone, are stored with corresponding system identification numbers :SID1-3 at predetermined addresses in ID ROM 370, i.e., FF00–FF20. In this case, a user has to register mobile identification number MID1 to a MTSO whose system identification number is SID1 as a home area user. Likewise, MID2 and MID3 have to be registered to MTSOs having SID2 and SID3, respectively.

A connection control operation of mobile telephone apparatus 100 will now be described with reference to FIG. 7. When the power switch in switch unit 470 of telephone unit 400 is turned on, the respective components are powered by power source 390 (step 801).

FIG. 8 is a detailed flow chart which illustrates the initial radio channel connection operation after the power supply is turned on. In response to a control signal from CPU 331, radio controller 336 in radio unit controller 330 controls synthesizer 320 to change the frequency of output therefrom. Thereby, a predetermined range of control channels (referred to as D channels hereinafter) are scanned in demodulator 312 to obtain the information indicative of electric field intensity of the received signals over each channel (step 1301). The channel having the strongest electric field intensity is selected from the D channels and the apparatus is ready for receiving signals through the D channel having the strongest electric field intensity. In this case, information of a channel having the second strongest intensity is also obtained.

Under the control of CPU 331, audio circuit controller 339 controls audio circuit 337 so that the output of demodulator 312 is applied to the input of control signal processor 338 and the output of control signal processor 338 is applied to the input of modulator 314.

Control signal processor 338 performs bit and frame synchronization operations on signals received through the selected D channel (step 1302). Thereby, a communication link is established between the mobile telephone and a base station. System information is then detected by signals received through this D channel at control signal processor 338 (step 1303) and sent to CPU 331. The system information includes a system identification number (SID) and a range of frequency channels (referred to as P channels hereinafter) to be scanned next. The received SID represents a MTSO covering the area where the mobile telephone is located. CPU 331 stores the SID in a SID register of RAM 335. Also CPU 331 compares the received SID with SIDs stored in ID ROM 370 (FIGS. 4 and 6). Referring to FIG. 6, in the event that the received SID coincides with one of the stored SIDs, (SID1, SID2, SID3) CPU 331 selects a MID corresponding to the coincided SID. In the event that the received SID does not coincide with any one of the stored SIDs, CPU 331 selects a MID having a predetermined priority. The selected MID is stored in a MID register of RAM 335 as an identification number for the mobile telephone (step 1305).

If the word synchronization or system information reception is not performed within a predetermined period of time, the D channel having the second strongest intensity is used to repeat the above operation (step 1304). In this case, if word synchronization or system information reception is again not performed within the predetermined period of time, the demodulator scans the D channels again (step 1301).

Figure 7:
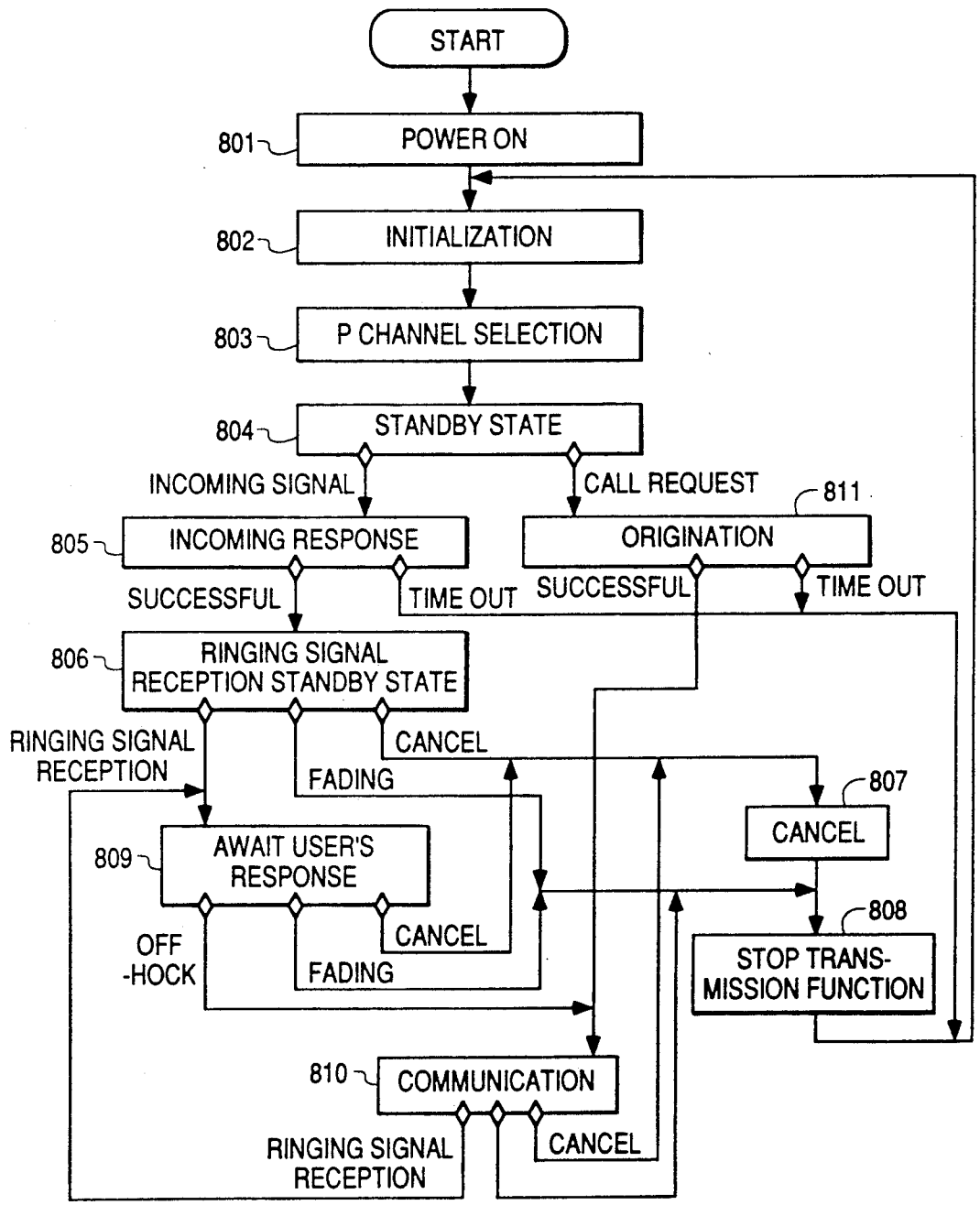
FIG. 7 is a flow chart illustrating the connection control operation sequence in the cellular telephone system of the present invention.

When the above initialization operations are completed, scanning similar to the above scanning operation is performed for the P channels for receiving an incoming signal (step 803 in FIG. 7).

FIG. 9 is a detailed flow chart which illustrates the P channel connection after initialization. Responsive to a control signal from CPU 331, radio controller 336 controls synthesizer 320 to change the frequency of the output therefrom so that P channels are scanned in demodulator 312 (step 1401) to obtain the information indicative of the electric field intensity of the received signals. The apparatus is ready for receiving information through the P channel having the strongest electric field intensity. In this case, information indicative of the P channel having the second strongest intensity is also obtained.

Control signal processor 338 performs bit and frame synchronization operations on signals received through the P channel which has the strongest electric field intensity (step 1402). After acquiring synchronization, control signal processor 38 obtains system information, including a SID representing a MTSO serving for the mobile telephone, from the following information signals (step 1403) and sends it to CPU 331.

Then, CPU 331 compares the obtained SID with SIDs stored in ID ROM 370 (FIGS. 4 and 6). Referring to FIG. 6, in the event that the obtained SID coincides with one of the stored SIDs (SID1, SID2 or SID3) CPU 331 selects a MID corresponding to the coincided SID. In the event that the obtained SID does not coincide with any one of the stored SIDS, CPU 331 selects a MID having a predetermined priority. The selected MID is stored in a MID register of RAM 335 (FIG. 5) as an identification number of the mobile telephone (step 1405).

If the word synchronization or system information reception is not performed within a predetermined period of time, an operation similar to the one described above is performed for the P channel having the second strongest intensity (step 1404). In this case, when word synchronization or system information reception is again not performed within the predetermined period of time, initialization is resumed (step 1102). If position information is not obtained from system information, initialization is also resumed (step 1102). The above connection control operations set the apparatus to the receive standby mode (step 1104).

Next, a call origination processing sequence will be described. FIG. 10 is a detailed flow chart showing outgoing call processing.

In the standby state in step 804 of FIG. 7, when a call request is detected by an input at the key unit 430, a timer for counting a call reception time is set (step 1201). The set time is, e.g., 12 seconds.

Thereafter, the audio controller in the radio unit causes the demodulator to scan each predetermined control channel (step 1202) to obtain reception electric field intensity information. The channel having the strongest electric field intensity is selected from these control channels and the apparatus is set to receive a signals through the control channel having the strongest intensity. In this case, information indicative of the control channel having the second strongest electric field intensity is also obtained.

Next, the presence of the user wishing to make a call is checked (step 1203). This check is performed as follows. If the user enters a telephone number to be called on key pad 430 and depresses the "SEND" key, these key inputs are detected by handset controller 418. Handset controller 418 sends a detection signal to CPU 331 in radio unit controller 330. Responsive to the detection signal, a call flag in CPU 331 is set at a logic "1." In this case, the apparatus determines that the user wishes to make a call. However, if the user depresses the "END" key after depression of the "SEND" key, the call flag is reset at a logic "0." In this case, the apparatus determines that the user does not wish to make a call and initialization is resumed (step 802).

Control signal processor 338 performs bit and frame synchronization operations of the currently received control channel. That is, word synchronization thereof to obtain system information from this control channel. CPU 331 then obtains a SID from the received system information and compares the obtained SID with SIDs stored in ID ROM 370 (FIGS. 4 and 6). Referring to FIG. 6, in the event that the obtained SID coincides with one of the stored SIDs, CPU 331 selects a MID corresponding to the coincided SID. In the event that the obtained SID coincides with neither one of the stored SIDs, CPU 331 selects a MID having priority which is predetermined. The selected MID is stored in the MID register of RAM 335 (FIG. 5) as an identification number of the mobile telephone (step 1204). However, if word synchronization cannot be performed, the same operation is performed using the control channel having the second strongest intensity (step 1205). In this case, if no word synchronization can be performed, initialization is resumed (step 802).

And then, the apparatus confirms again whether the user wishes to make a call (step 1206). As described above, if the call flag is set at logic "1," the apparatus determines that the user wishes to make a call. However, if the call flag is set at logic "0," the apparatus determines that the user does not wish to make a call and initialization is resumed (step 802).

CPU 331 confirms whether the selected control channel is appropriate for the origination signal to be broadcast by analyzing the system information signal from a base station. Upon the selection of an appropriate control channel, a channel selection flag in CPU 331 is changed from logic "0" to "1." However, if any appropriate control channel is not selected, initialization is resumed (step 802) without changing the content of the channel selection flag. If the selection of an appropriate control channel is delayed (step 1208), the apparatus checks again whether the user wishes to make a call. (step 1206).

If CPU 331 detects that the user wishes to make a call (i.e., the call flag is set at logic "1") and an appropriate control channel for broadcast of an origination signal is selected (i.e., the channel selection flag is set at logic "1"), a call origination signal including the telephone number to be called, which is entered by the user, is transmitted over this control channel with a MID (step 1209). At this time, the MID to be transmitted is stored in the MID register of RAM 335 (FIG. 5) in step 1305 of FIG. 8, step 1405 of FIG. 9 or step 1204. Accordingly, as a MID corresponding to a SID assigned to the serving MTSO is stored in the MID register of RAM 335, if any, the mobile telephone may be treated as a homer by the MTSO.

Immediately after the call origination signal with the MID is transmitted, CPU 331 sends the MID to handset controller 418 of transceiver unit 400b via digital interface 340. Receiving the MID, handset controller 418 controls display unit 450 so that the MID is displayed (step 1210). Also, CPU 331 may control voice synthesizer 350 so that sounds corresponding to the MID are synthesized and control audio circuit 337 so that the synthesized sounds are generated from loudspeaker 492.

Thereafter, the mobile telephone apparatus detects whether the acknowledge signal from the base station has been received (step 1211). The base station calls the other party to be called on the basis of the telephone number included in the origination signal. A communication link may then be established between the mobile telephone apparatus and the called telephone apparatus (step 1212). Otherwise, initialization is resumed (step 802). Thus, a communication link can be established as mentioned above (step 810), and thereafter the communication is closed.

As has been described, whenever a call is originated in response to an operation by a user, an MID corresponding to an SID of the MTSO serving the mobile telephone is transmitted to a base station. Accordingly, since the MTSO treats the mobile telephone as a home area user, it reduces speech charges for the mobile telephone.

In the present cellular radio telephone system, in addition to a call origination procedure, a location registration procedure is provided. In this procedure, to register a location where the mobile telephone exists to a base station, an MID of the mobile telephone is automatically transmitted to the base station. This procedure occurs by a request from a base station or during a processing of the mobile telephone and is not actuated by a user's operation. Before this procedure, a mobile telephone can obtain a system identification number through an initialization procedure (step 802 of FIG. 7) or the other procedures. Therefore, the mobile telephone may transmit an MID corresponding to an SID of the MTSO serving the mobile telephone in the automatic location registration procedure before a call is made by a user of the apparatus.

Furthermore, although CPU 331 selects an MID having a predetermined priority in the event that the received SID does not coincide with any one of the stored SIDs, an MID corresponding to an SID which is the most similar one with the received SID may be selected by comparing the received SID with the stored SIDs. For example, in the event that the received SID is "11111111", and SIDs "11111110" and "99999999" are stored, a MID corresponding to the SID "11111110" is selected. According to this embodiment, in the case that the SIDs are sequentially assigned to a plurality of MTSOs by a geographical order, speech charges for the mobile telephone may be reduced since the mobile telephone is treated as a roamer from a near area.

Furthermore, the content of MID register of RAM 335 may be displayed in response to a user's input for confirmation. For example, when the user depresses a predetermined order of keys on key unit 430, handset controller 418 detects this key input, reads the MID stored in the MID register of RAM 335, and controls display unit 450 so that the read MID is displayed on display unit 450. Also, upon the input for confirmation, CPU 331 may control voice synthesizer 350 so that sounds corresponding to the MID stored in the MID register of RAM 335 are synthesized and control audio circuit 337 so that the synthesized sounds are generated from loudspeaker 492.

A further feature of the present invention will now be described. Referring again to FIG. 7, in the standby state of step 804, the apparatus awaits an incoming call. Signals received over a selected P channel are applied to CPU 331 through audio circuit 337 and control signal processor 338. CPU 331 then examines whether the signals comprise one of the MID1-MID3 registered in ID ROM 370. Upon a match of an MID, a speech communication link is establised by using the matched ID therafter until the speech communication link is terminated. Then, an acknowledge signal is sent back through a predetermined channel (step 1105). At the same time, scanning of control channels (referred to as A channels hereinafter for receiving control signals from the base station is performed in the same manner as D and P channels. A frequency range of A channels is designated in the system information addressed to the apparatus which is obtained from signals transmitted via the P channel.

Responsive to a control signal from CPU 331, radio controller 336 controls synthesizer 320 to change the frequency of output therefrom so that A channels are scanned in demodulator 312 to obtain the information indicative of electric field intensity of the received signal. The apparatus is then ready for receiving information through the A channels having the strongest electric field intensity. Thereafter, control signal processor 338 performs bit and frame synchronization operation, i.e., word synchronization. This radio channel communication using A channels is also a communication link between the mobile telephone and the base station. When a speech channel designation signal accompanied with said match ID is received through the A channels, the channels are switched to the designated speech channels which include a forward channel for transmitting audio signals to the base station and a backward channel for receiving audio signals from the calling apparatus via the base station (step 1107). Thereby a communication link has been established between the mobile telephone and the calling apparatus via the base station.

When the user responds to the ringing tone by depressing the "SEND" key, handset controller 418 detects the key operation and sends a control signal of "SEND" key operation to CPU 331 via digital interface 340 by way of lines 1002. Also in the event that the user takes handset 400b off-hook, information indicating the closed state of the hook switch in switch 470 (FIG. 4) is transmitted to CPU 331 via digital interface 340 by way of line 1001. Responsive to the off-hook control signal or the information, CPU 331 sends a connection signal to audio circuit controller 339. Receiving the connection signal, audio circuit controller 339 controls audio circuit 337 so that demodulator 312 and modulator 314 are connected to audio input/output unit 490 by way of line 1003. Accordingly, the user may communicate with the calling party by using hands-free microphone 494 and loudspeaker 492 or handset microphone 466 and handset receiver 498. When fading occurs for a predetermined period of time or longer in the speech channel reception mode (step 1106), the acknowledge signal sending state (step 1104) or a communicastion enable state (step 1110), the transmission function is disabled (step 1108). When the transmission function is disabled (step 1108), initialization is resumed (step 1102).

In the present cellular radio telephone system, as previously described, a location information of a mobile telephone is registered in a base station and renewed through the automatic location registration procedure. Accordingly, the base station usually braodcasts a paging signal, i.e., an incoming signal to a base station with the registered MID and may not broadcast a paging signal with the other MID. However, in the event that an emergency paging method, in which a paging to a mobile telephone is made with all the MIDs that the mobile telephone has, is adopted, the mobile telephone in accordance with this embodiment may receive an incoming call with an MIDs that the mobile telephone has.

Although an embodiment applied to a mobile telephone apparatus has been described, it is apparent to those skilled in this art that this invention may be easily applied to any kind of radio telecommunication apparatus, for example, to a transportable type radio telephone or a portable type radio telephone. This invention also is applicable to a cordless telephone system wherein a plurality of zones are covered by a plurality of base units and a mobile unit (a cordless telephone) is capable of communicating with the apparatus wherever the mobile unit moves around within the zones. Furthermore, the concepts of the present invention may be applied to a data transmission apparatus used in a cellular radio telecommunication system.

I claim:

1. Radio telecommunication apparatus for use in a radio telecommunication system, wherein said radio telecommunication system encompasses a plurality of areas each having one or more base units which broadcast a system identification number over one or more radio channels within the area of said base units, said radio telecommunication apparatus comprising:

receiving means for receiving a system identification number;

storing means for storing a plurality of identification numbers for said apparatus and a plurality of system identification numbers, each of said identification numbers for said apparatus corresponding to one of said system identification numbers; and transmitting means responsive to said receiving means and said storing means for transmitting a stored identification number for said apparatus corresponding to a stored system identification number which is identical to said received system identification number.

2. The apparatus of claim 1 wherein said transmitting means further transmits an identification number for the apparatus corresponding to a stored system identification number which has a predetermined relationship with the received system identification number in the event that the received system identification number is not identical to any one of said stored system identification numbers.

3. The apparatus of claim 1 wherein said transmitting means further transmits a predetermined identification number of the apparatus in the event that the received system identification number is not identical to any one of the stored system identification numbers.

4. The apparatus of claim 1 further comprising alarming means responsive to said transmitting means for alarming a user of the apparatus.

5. The apparatus of claim 1 further comprising display means responsive to said transmitting means for displaying said transmitted identification number of the apparatus.

6. The apparatus of claim 1 further comprising voice synthesis means responsive to said transmitting means for generating a synthesized voice corresponding to said transmitted identification number of the apparatus.

7. The apparatus of claim 1 further comprising input means for inputting a confirmation request to said transmitting means and display means responsive to said transmitting means and said input means for displaying said transmitted identification number of the apparatus.

8. The apparatus of claim 1 further comprising input means for inputting a confirmation request to said transmitting means and voice synthesis means responsive to said transmitting means and said input means for generating a synthesized voice corresponding to said transmitted identification number of the apparatus.

9. Cellular telecommunication apparatus comprising:

receiving means for receiving signals including a system identification number, the signals being broadcast over one or more radio channels;

storing means for storing a plurality of identification numbers for said apparatus and a plurality of system identification numbers, each of said identification nubmers for said apparatus corresponding to one of said system identification numbers;

comparing means coupled to said receiving means and said storing means for comparing the received system identification number with each of the system identification number stored in said storing means; and transmitting means responsive to said comparing means for transmitting an identification number of the apparatus corresponding to a system identification number stored in said storing means which is identical to the received system identification number.

10. Radio telecommunication apparatus for use in a radio telecommunication system, wherein said radio telecommunication system encompasses a plurality of areas each having one or more base units which broadcast a system identification number over one or more radio channels within the area of said base units, said radio telecommunication apparatus comprising:

input means for inputting a call origination request and address information of a radio telecommunication apparatus to be called;

receiving means responsive to said input means for receiving the system identification number;

storing means for storing a plurality of identification number of the apparatus and a plurality of system identification numbers, each of the identificatin numbers of the apparatus corresponding to one of the system identification numbers;

comparing means, coupled to said receiving means and said storing means, for comparing the received system identification number with each of the stored system identification numbers; and transmitting means coupled to said comparing means for transmitting a stored identification number of the apparatus, corresponding to a stored system identification number which is identical to the received system identification number, with the input address information to the base staion in response to the call origination request.

11. The apparatus of claim 10 wherein said transmitting means further transmits a predetermined identification number of the apparatus in the event that the received system identification number is not identical to any one of said stored system identification numbers.

12. The apparatus of claim 10 wherein said transmitting means further transmits an identification number for the apparatus corresponding to a stored system identification number which has a predetermined relationship with the received system identification number in the event that the received system identification number is not identical to any one of said stored system identification numbers.

13. The apparatus of claim 10 further comprising display means responsive to said transmitting means for displaying said transmitted identification number of the apparatus.

14. The apparatus of claims 11 or 12 further comprising alarming means responsive to said input means and said comparing means for alarming a user of the appartus when the received system identification number is not identical to any one of the stored system identification numbers.

15. The apparatus of claim 14 wherein said alarming means comprises voice synthesis means for synthesizing a predetermined voice.

16. Radio telecommunication apparatus comprising:

receiving means for receiving signals including one or more mobile identification numbers, the signals being broadcast over one or more radio channels;

storing means for storing a plurality of identificatin numbers of the apparatus;

comparing means coupled to said receiving means and said storing means for comparing the received mobile identification numbers with said identification numbers of the apparatus stored in said storing means; and transmitting means responsive to said comparing means, in the event that one of the received mobile identification numbers is identical to one of the stored identification numbers of the apparatus, for transmitting a response signal including the identical mobile identification number over a radio channel.

17. A method of registering a location of a mobile unit for use in a radio telecommunication system, wherein said radio telecommunication system encompasses a plurality of areas each having one or more base units which broadcast a system identification number over one or more radio channels within the area of said base units, the method comprising the steps of:

storing a plurality of identification numbers of the mobile unit and a plurality of system identification numbers, each of the identification numbers of the mobile unit corresponding to one of the system identification numbers;

receiving a system identification number broadcast from a base station;

comparing the received system identification number with the stored system identification nubmers; and transmitting a stored identification number of the mobile unit, corresponding to a stored system identification number which is identical to the received system identification number, to the base station.

18. The method of claim 17 wherein the step of transmitting further comprises the step of transmitting a predetermined identification number of the mobile unit in the event that the received system identification number is not identical to any one of the stored system identification numsers.

19. The method of claim 17 wherein the step of transmitting further comprises the step of transmitting an identification number of the mobile unit corresponding to a stored system identification number which is most similar to the received system identification number in the event that the received system identification number is not identical to any one of the stored system identification numbers.

20. A method of originating a call from a mobile unit for use in a radio telecommunication system, wherein said radio telecommunication system encompasses a plurality of areas each having one or more base units which broadcast a system identification number over one or more radio channels, the method comprising the steps of:

storing a plurality of identification numbers of the mobile unit and a plurality of system identification numbers, each of the identification numbers of the mobile unit corresponding to one of the system identification numbers;

inputting a call origination request with address information of a mobile unit to be called;

receiving a system identification number broadcast from a base unit;

comparing the received system identification number with each of the stored system identification numbers;

transmitting a stored identification number of the mobile unit, corresponding to a stored system identification number which is identical to the received system identification number, with the address information to the base unit in response to the call origination request.

21. The method of claim 20 wherein the step of transmitting further comprises the step of transmitting an identification number of the mobile unit corresponding to a stored system identification number which is most similar to the received system identification number in the event that the received system identification number is not identical to any one of the stored system identification numbers.

22. The method of claim 20 wherein the step of transmitting further comprises the step of transmitting a predetermined identification number of the mobile unit in the event that the received system identification number is not identical to any one of the stored system identification numbers.

* * * * *

UNITED STATES PATENT AND TRADEMARK OFFICE
CERTIFICATE OF CORRECTION

PATENT NO. : 5,101,500
DATED : March 31, 1992
INVENTOR(S) : Kuniyoshi MARUI It is certified that error appears in the above-identified patent and that said Letters Patent is hereby corrected as shown below:

IN THE CLAIMS:

```
Col. 11, claim 9,    line 64, change "nubmers" to --numbers--.

Col. 12, claim 9,    line 1,  change "number" to --numbers--.

claim 10,   line 22, change "number" to --numbers--;
                     line 23, change "identificatin" to
                     --identification--; and
                     line 35, change "staion" to --station--.

claim 14,   lines 56 and 57, change "appartus" to
                     --apparatus--.
         claim 16,   line 67 change "identificatin" to
                     --identification--.

Col. 13, claim 17,   line 28, change "nubmers"  to --numbers--.

claim 18,   line 38, change "numsers" to --numbers--.
```

Signed and Sealed this

Thirteenth Day of July, 1993

Attest:

MICHAEL K. KIRK

*Attesting Officer*   Acting Commissioner of Patents and Trademarks